Nov. 16, 1954 A. E. BACHELET 2,694,801

PULSE COUNTING AND REGISTRATION SYSTEM

Filed Dec. 18, 1951 3 Sheets-Sheet 1

INVENTOR
A. E. BACHELET
BY J. W. Schmied
ATTORNEY

Nov. 16, 1954 A. E. BACHELET 2,694,801

PULSE COUNTING AND REGISTRATION SYSTEM

Filed Dec. 18, 1951 3 Sheets-Sheet 2

INVENTOR
A. E. BACHELET
BY J W Schmied
ATTORNEY

Nov. 16, 1954 A. E. BACHELET 2,694,801

PULSE COUNTING AND REGISTRATION SYSTEM

Filed Dec. 18, 1951 3 Sheets-Sheet 3

INVENTOR
A. E. BACHELET
BY J. W. Schmied
ATTORNEY 2,694,801

PULSE COUNTING AND REGISTRATION SYSTEM

Albert E. Bachelet, New York, N. Y., assignor to Bell Telephone Laboratories, Incorporated, New York, N. Y., a corporation of New York Application December 18, 1951, Serial No. 262,240

5 Claims. (Cl. 340—147)

This invention relates generally to signaling systems and more particularly to arrangements in such systems for detecting and counting signal impulses.

The invention has for its main object the improvement of gas tube counting and registering circuits.

Another object of the invention is to increase the speed of operation of an impulse counting and registering arrangement suitable for use in a telephone dialing circuit.

Another object of the invention is to use gaseous discharge devices having a plurality of conductive positions in an impulse counting and registering circuit so as to eliminate the many relays or tubes that have been required in the prior art.

A feature of the invention is the utilization of cold cathode gaseous discharge stepping devices that have a plurality of cathodes.

Another feature of the invention is the use of multicathode gaseous discharge devices for successively counting the groups of pulses that represent the digits of a designated telephone number.

Another feature of the invention is a means for momentarily associating the pulse counting multicathode gaseous discharge devices with successive register means during the interdigital dialing pauses.

Figure 1:
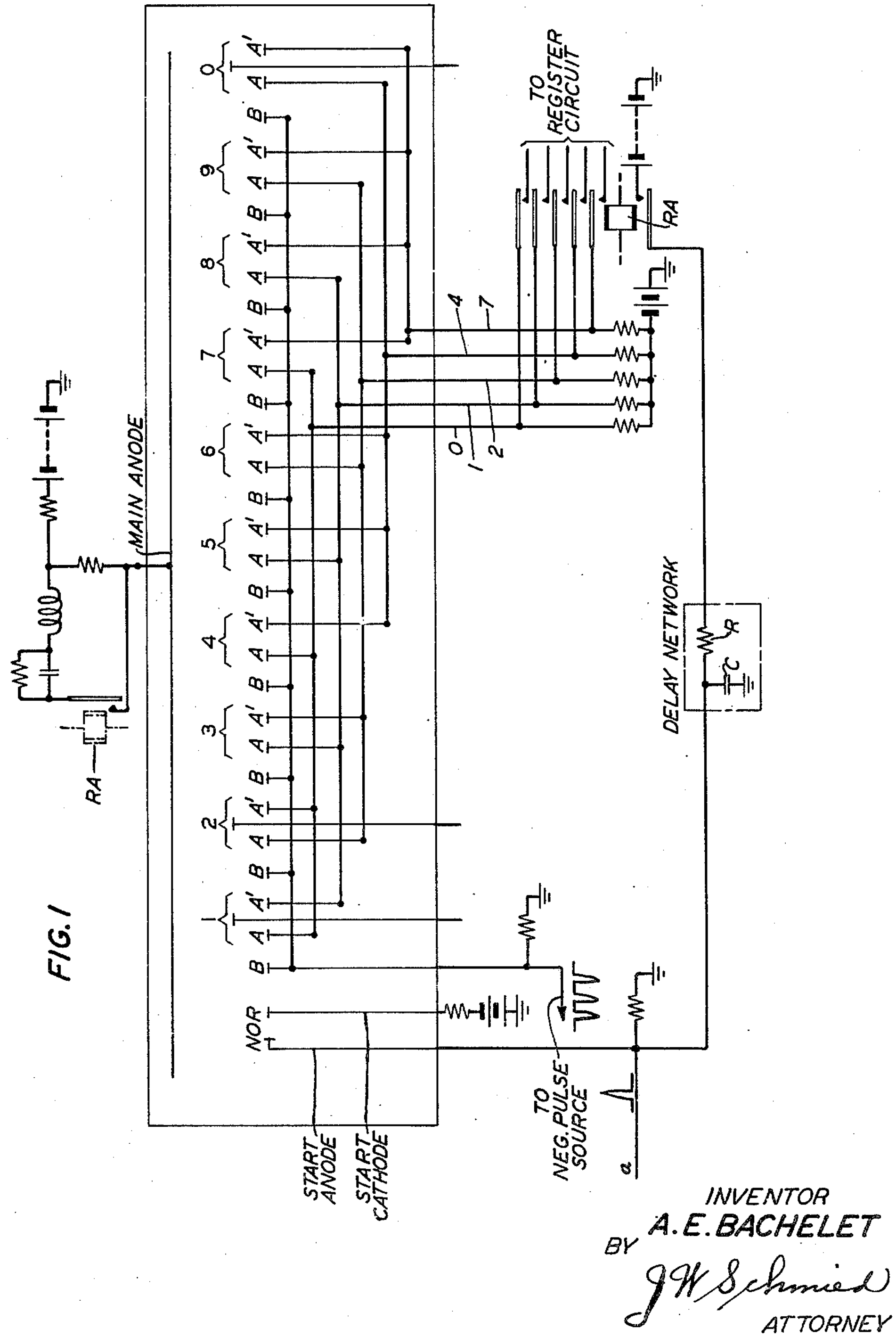
Figure 2:
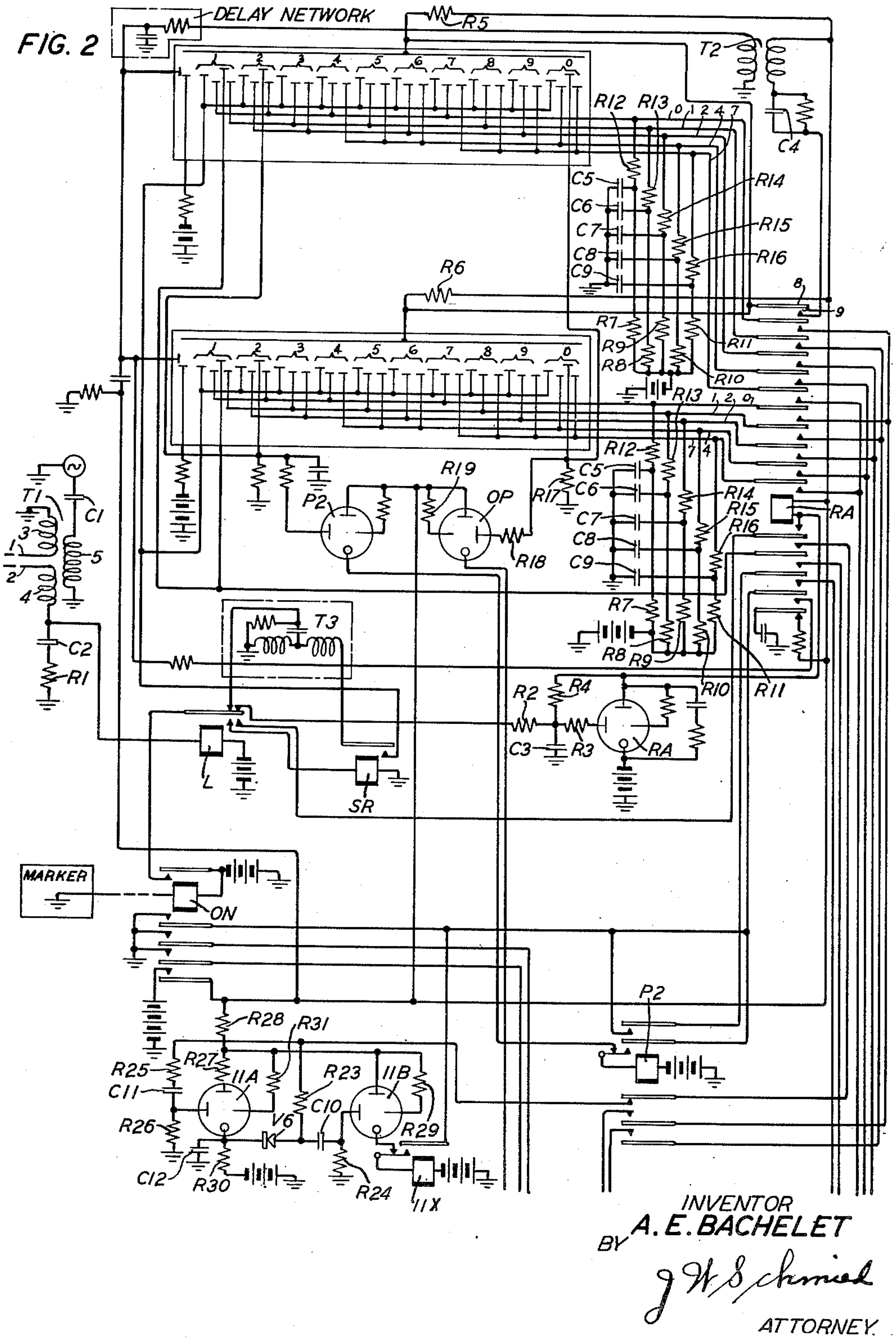
Figure 3:
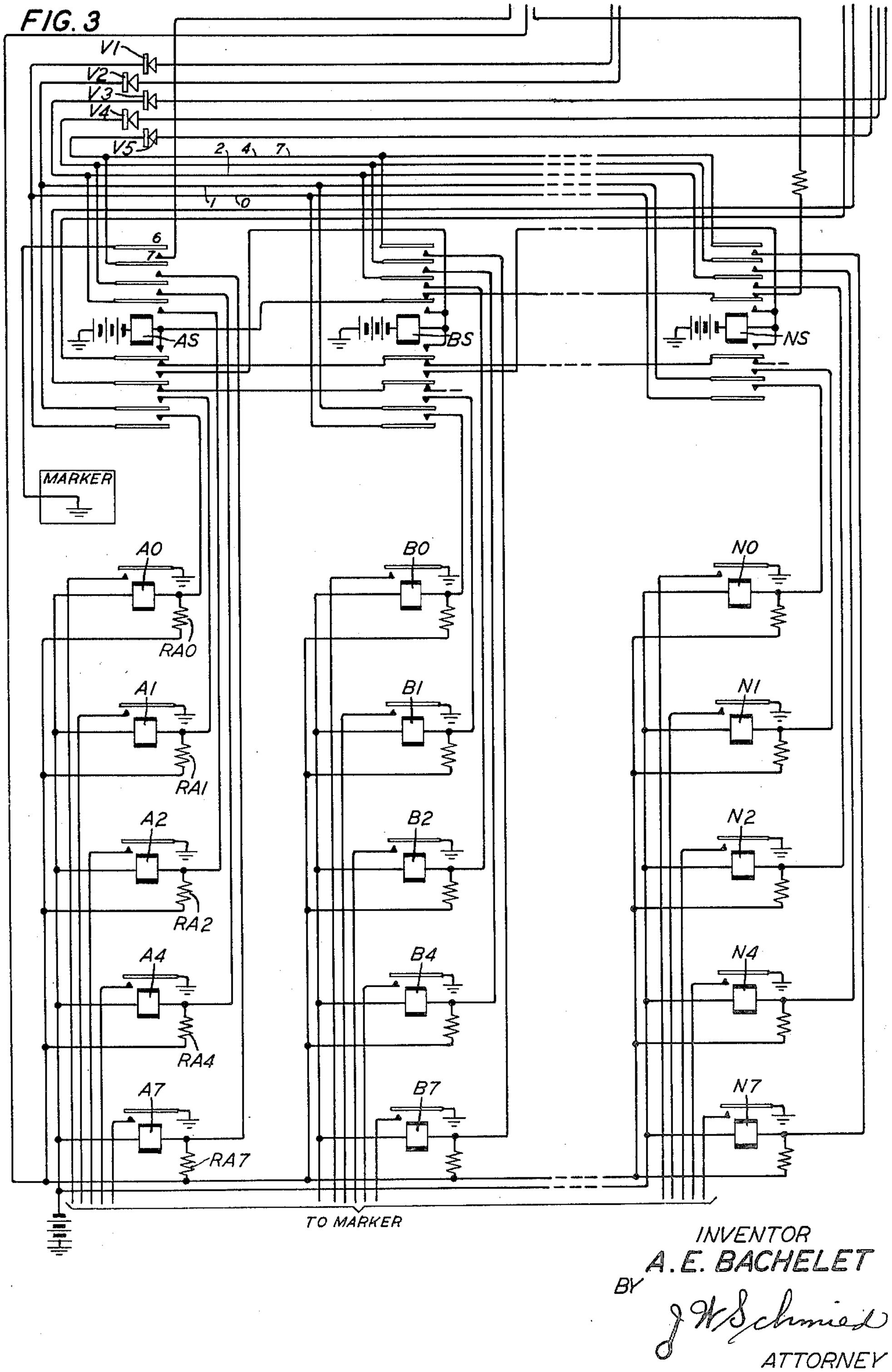

A preferred embodiment of the invention is shown in the accompanying drawings in which:

Fig. 1 is a simplified circuit of a multiconductive position gaseous counting tube and is used merely to illustrate the basic principles of operation of the tube; and Figs. 2 and 3 which together form a circuit diagram of a preferred exemplary embodiment of the invention.

In present day signaling systems, such as may be used in automatic telephone systems, continuous effort is being made to increase the speed of circuits responsive to dial signals. In the telephone field in particular, continuous effort is exercised towards producing circuits which will respond accurately at a more rapid rate to signals such as dial pulses or the like.

The present invention is herein disclosed as embodied in an automatic telephone system such as is disclosed in the application of A. J. Busch, Serial No. 57,394, filed October 29, 1948, and now Patent No. 2,585,904, dated February 19, 1952. Busch discloses in detail a crossbar system wherein originating register circuits are used for transmitting dial tone to coin subscribers, for counting the pulses of called digits, for registering the called digits, and for seizing an idle marker circuit for the purpose of having such a marker complete the desired connection. Since the present invention relates solely to pulse counting and registering circuits, only those portions of an originating register have been disclosed and described herein. A copending application by J. W. Dehn, Serial No. 57,398, filed October 29, 1948, now Patent No. 2,616,974, dated November 4, 1952, discloses a skeletonized arrangement of the Busch disclosure including an originating register circuit in some detail. The Dehn and Busch disclosures may be referred to for such details, if any, omitted from the present description as needed for the incorporation of the present invention in a more complete system.

This invention is not necessarily so limited in its utility that it must be used as a part of an originating register. It can be applied in any organization wherein the rapid detection, counting, and registering of pulses is required.

The function of an originating register in the crossbar system as disclosed by Busch and Dehn is to receive, detect, count, and register dial pulses transmitted thereto by the dialing action of a calling subscriber. It is the improvement of such counting circuits with which the present invention, in one of its forms, finds utility by improving the speed of response of such originating registers, and by simplifying such registers.

As may be obtained from the Busch or Dehn disclosure, the general sequence of events during the origination of a call by a subscriber is as follows:

1. The calling subscriber lifts his receiver, thereby seizing an idle marker circuit and automatically informing the seized marker that a dial tone connection is desired.
2. The seized marker tests for and seizes an idle originating register circuit.
3. The marker interconnects the calling line with the seized originating register circuit over the cross-bar switch trains and then the marker releases.
4. The originating register transmits dial tone to the calling subscriber.
5. The calling subscriber dials the digits of the called number.
6. The originating register receives, follows and counts the pulses of each digit, and then registers such digits.
7. When sufficient digits have been registered therein, the originating register seizes an idle marker circuit and transfers thereto, among other items of information pertaining to a call, the digits so registered.
8. The marker, when it has received all of the information from the originating register, releases the originating register, completes the call, and releases itself.

Since the present invention is embodied only in the circuits of an originating register, in so far as the present disclosure is concerned, the subsequent description will only cover items 4, 5, and 6 above. The other items are fully disclosed by Busch and Dehn and are incorporated herein by reference.

*Stepping tube*

Since the stepping tube used in this invention is relatively new in the art, a brief description of its mode of operation is appropriate. This tube is of the same general type as shown in the applications by H. L. von Gugelberg, Serial No. 141,123, filed January 28, 1950, now Patent No. 2,646,523, dated July 21, 1953, and by M. A. Townsend, Serial No. 109,337, filed August 9, 1949, now Patent No. 2,575,371, dated November 20, 1951. These applications are cited merely to acquaint one more fully with the construction and operation of such tubes. The present invention is not to be considered as employing exclusively the tubes of the von Gugelberg or Townsend disclosures.

The stepping tube which performs the counting function for the subscriber's originating register is shown in Fig. 1 of the drawings. With reference to this figure it may be observed that the tube has a neutral position designated NOR and ten other positions which permit the counting of any digit 1 to 0. The tube is provided with a main anode, two A cathodes in each of the ten counting positions designated A and A', and an additional cathode in its positions 1, 2, and 0, for performing service functions to be explained hereinafter. Interposed between each double set of cathodes as well as the NOR electrodes are stepping cathodes B, all of which are connected together. The purpose of the B cathodes is to transfer the discharge from a preceding to a succeeding position for each dial pulse received. The twenty A cathodes in the ten counting positions are strapped together internally to provide a two-out-of-five code.

When the circuit of Fig. 1 is energized a positive pulse is applied to the start anode, ionizing the tube in the NOR position. As a positive pulse is applied to the start anode over lead "*a*," conduction takes place between the start anode and start cathode. When the pulse is removed from the start anode its potential drops and conduction takes place between the main anode and the start cathode.

In order to step the tube it is necessary to apply negative pulses to the lead connecting the B cathodes. In order for the B cathode at the No. 1 position to seize the discharge from the NOR position, the amplitude of the negative pulses must be greater than the negative potential applied to the start cathode.

When the negative pulses are applied to the B cathode line the B cathodes will become highly negative. The potential difference between the main anode and the B cathode at the first position will become much greater than the potential difference between the main anode and the start cathode. As a result, the discharge path will move to the B cathode of the first position. When the negative pulse terminates, the potential on the B cathode will fall and the discharge will move from the B cathode to the two A cathodes at the first position. The A cathodes will sustain the discharge since they are connected through load resistors to a source of negative potential.

When another negative pulse is applied to the B cathodes, a similar action takes place, stepping the discharge from position 1 to position 2. In this manner the count progresses until the digit is fully counted. The tendency of the discharge to move in one direction rather than the other is governed by the geometry of the tube and the fact that the ionization density on the A cathodes is greater in the forward than in the backward direction.

At the end of each digit or series of pulses, relay RA is operated (by a circuit not shown on Fig. 1) and connects the five "A" cathode leads to relays in associated register circuits. For reasons described hereinafter, only the relays connected to the two "A" cathode leads over which conduction is taking place will operate.

During the counting interval the anode current is low, being limited by the anode resistance. However, when it is required to operate the register relays, the anode current is increased momentarily by the action of the tuned circuit shunted across the anode resistance by relay RA. This momentary increase of tube current operates the register relays.

At the termination of the momentary increase of tube current, the tube again is ionized at the NOR position by a delayed positive pulse originating at a lower contact of the RA relay and applied through a delay network to the start anode. The probes at positions 1, 2 and 10 are for service functions hereinafter described.

*Circuit description*

An exemplary embodiment of the invention as used in an originating register is shown on Figs. 2 and 3. Fig. 2 shows in detail a circuit that detects and counts the pulses sent over the subscriber's line. Fig. 3 shows in detail a circuit that will register and store the number of pulses counted by the apparatus shown in Fig. 2. Information representing the number of pulses in the first digit received will be stored in the column of register relays designated A0 . . . A7. The second number will be stored in the column of relays designated B0 . . . B7. The dotted lines connecting the relays of the "B" column with those of the "N" column indicate that as many columns of relays may be inserted as there are digits or numbers to be stored. Thus in a city such as Chicago, New York, or Washington, where the telephone numbers are designated by two letters followed by five digits, it would be necessary to have seven columns of relays in order to store the seven numbers constituting a complete "telephone number."

In the embodiment shown in Figs. 2 and 3, two stepping tubes are operated in parallel in order to detect a trouble condition. Under normal operating conditions both tubes will advance to the same conductive position in response to dial pulses. Should one tube become defective, the conductive positions in the two tubes will be different after a series of pulses has been received. This difference will cause either three or four cathode leads rather than two to be conductive. Consequently, three or four register relays rather than two will be operative. Subsequent circuits in the marker will detect this trouble condition.

When the marker seizes an idle originating register circuit as is partly disclosed in Figs. 2 and 3, the off-normal relay ON is operated by a ground in the marker as shown by a dotted line in Fig. 2. Relay ON, upon operating, prepares the register circuit for the operation as follows:

1. Positive battery is applied to the main anodes of the gas tubes 11A, 11B, P2 and OP, and to other parts of the circuit;

2. A ground is supplied to various parts of the circuit. Relay AS operates at this time; and 3. The lower contact of ON, when operated, transmits a positive pulse to the start anodes of the stepping tubes causing them to ionize at the NOR position.

After seizure by a marker of an idle originating register circuit, as outlined above, the marker effects interconnection over the cross-bar switch trains between the seized register and the calling line, thereby connecting ring and tip, conductors 1 and 2, of the register to the calling line loop. The alternator in series with condenser C1 and winding 5 provides dial tone to the transformer T1. The alternator is controlled by circuits, not shown, which insure that the dial tone will be applied to the subscriber's line only at the desired time. Condenser C2, resistor R1, and windings 3 and 4 of transformer T1 provide a means of impressing dial tone on the subscriber's line. Relay L is operated when the subscriber removes the receiver from the switchhook in a circuit extending from ground on winding 3, through the subscriber's line, through winding 4 of transformer T1, to battery through the L relay winding.

The L relay repeats the dial pulses received over the subscriber's line. A time-measuring circuit comprising tube RA and relay RA determines the interdigital time. An 11X circuit which includes gas tubes 11A and 11B and the P2 tube and relay are provided to register a prefix 11 on a prefix counter and not on the regular digit register. The P2 relay circuit prevents any digit of one pulse from being registered on the A digit register. The steering relays AS, BS . . . NS, and the register circuit function to operate two-out-of-five register relays for each counting position in the tubes.

When relay L operates it operates relay SR, a slow release type relay, and starts an interdigital timing circuit comprising tube RA, relay RA, condenser C3, and resistor R4. R2 and R3 are current limiting resistors. At this time the RA relay may or may not operate, depending upon the length of the time relay L is operated. In either case no useful function is performed at this time. If the L relay is operated for a sufficient time to allow condenser C3 to charge to a positive potential, through the winding of relay RA and resistor R4 to the ionizing potential of tube RA, tube RA will fire and the RA relay will operate because the locking contacts of relay RA extend the negative battery from the contacts of relay ON through the contacts of relay L operated and through the above-mentioned locking contacts of relay RA to the anode of tube RA which then extinguishes since at this time it has negative battery both on its anode and on its cathode. Tube RA is extinguished when relay RA operates. The RA relay will release upon initiation of the dialing pulses because the locking circuit for it is broken upon the first release of the L relay. Tubes RA, P2, OP, 11A and 11B are common four element cold cathode tubes.

When the L relay releases on the first pulse of the first digit, relay RA releases and the stepping tubes step to the No. 1 position by virtue of the negative driving pulse applied to the B cathodes by the pulse forming transformer T3. A second dial pulse steps the tubes into position to 2. Finally, when the digit is fully counted, the L relay remains operated, tube RA ionizes and operates relay RA. Relay SR is a slow release relay and remains operated during dialing.

If now it is assumed that the digit 8 were counted, leads 1 and 7 would be energized and the operation of the relay RA would then operate register relays A1 and A7 by the following considerations. The anode current of the stepping tubes during the counting interval is low, being limited by the resistances R5 and R6. When relay RA operates, however, a higher anode current than these tubes usually supply is required for the operation of the two register relays. This increased current is momentarily obtained by shunting the anode resistances R5 and R6 by a network comprising transformer T2 and condenser C4, causing a damped oscillation to be generated. This damped oscillation causes the anode current to rise to a maximum value.

A positive pulse from the secondary winding of transformer T2 is applied through a delay network to the start anode of the stepping tubes at the normal position. When this voltage is sufficiently positive to ionize the control gap, the stepping tubes again ionize at the NOR position. The delay network delays the normalizing pulses long enough so that the remaining contacts on relay RA make and operate the desired register relays before the stepping tubes are normalized.

After the last pulse of a digit has been received relay RA operates as hereinbefore described. The anode current over the conductive cathode leads 7 and 1 (for the eighth position) causes an IR drop through resistors R8 and R11 which causes condensers C6 and C9 to discharge from a normal potential of −48 volts during the nonconductive condition of the tube to about 0 volts during the conductive periods. The operation of the RA relay connects the five translating leads through the contacts of relay AS and through varistors V1 to V5 to the register relays A0, A1, A2, A4, and A7. The two capacitors, C6 and C9, that are discharged, will charge through the windings of relays A1 and A7 causing them to operate and lock over resistors RA1 and RA7 to a ground supplied by a contact of relay ON.

The resistance of RA0 . . . RA7 is of a high enough value so as not to operate relays A0 . . . A7 initially. However, these resistances are of low enough value to prevent any relay already operated from releasing.

Contacts 8 and 9 on the RA relay are adjusted so as to make much earlier than the other contacts. This adjustment allows the anode current to build up and discharge condensers C5 and C9 fully before the register relays A0 . . . A7 are connected to the circuit.

Resistors R12 . . . R16 are isolation resistors used to prevent oscillation between adjacent cathodes of the tubes.

Varistors V1 to V5 are provided to prevent the register relays from releasing after they are operated. As an example, if we consider the stepping tubes in the ionized position 8, resistances R8, R11, R13 and R16 will impress the voltage across relays A1 and A7, causing the relays to operate. When the stepping tube is normalized these resistors will be shunted across relays A1 and A7 which might cause them to release if the varistors were not provided to raise the circuit impedance. This is because resistors R8 and R11 will put a negative battery on one side of relays A1 and A7 which already have a negative battery on the other side. The voltages impressed across the varistors in this circuit are small and well within their safe operating range.

A certain interval of time after relay RA operates, relay BS operates over a path including a pair of lower contacts on relay AS operated, a pair of upper make contacts on relay P2 operated, to a ground on the contacts of relay ON. Relay BS is of the slow operate type so that it does not operate until the register relays for the "A" digit have had time to operate. Relay AS will release when relay RA releases upon the reception of the first pulse of the next digit.

As the pulses of the next digit are received the tubes advance in the same fashion as for the first digit. At the termination of pulses the RA relay again operates and operates two of the register relays in the "B" column.

The receipt, detection, counting, steering, and registering of subsequent digits is accomplished similarly as explained for the first two digits and further detailed analysis of the circuit operation is considered unnecessary.

When the originating register has registered in its relays of Fig. 3 sufficient digits to warrant seizure of an idle marker for completion of the call, such a marker is seized as disclosed by the Busch and Dehn disclosures, supra. When an idle marker is seized, the information registered in the digit registers of Fig. 3 is transferred to the marker on a two-out-of-five code basis.

The marker releases the originating register, thereby returning all apparatus of Figs. 2 and 3 to normal, completes the desired connection, and releases leaving the connection under the supervision of a trunk.

*Zero operator calls*

The additional cathode in position 10 is to provide an alarm condition whenever the tubes are stepped to the tenth position by the pulses of the first digit. When the tubes are conducting in the tenth position the potential on one side of resistor R17 becomes somewhat positive. This potential increase is transmitted through isolation resistor R18 to tube OP which now ionizes. Resistor R19 provides current for the keep-alive anode of the tube OP. Tube OP, when ionized, will call in the marker over contacts 6 and 7 of the AS relay when operated. Since the AS relay is only operated during the reception of the pulses of the first digit, the OP tube circuit will be ineffective at any other time.

The operation of this circuit may be summarized as follows: When the calling subscriber dials 0 for the A digit, ten pulses will be transmitted, causing the stepping tube to ionize in the 0 position. Tube OP ionizes and, with steering relay AS operated the associated marker start relay, not shown, operates to call in the marker. When relay RA operates at the end of the digit, register relay A4 and A7 operate to indicate the digit 0 and the circuit functions in the manner previously described. It is to be noted that relays A4 and A7 operate to represent the digit 10 to the marker. The marker is wired so that a 4 and a 7 do represent 0, and no trouble is caused by the fact digits 7 and 4 represent 11 numerically rather than 0.

*11X calls*

It may be desired that different action should be taken by the telephone system should two one-pulse digits be dialed before another digit. The 11X circuit is provided for this purpose and its function is as follows: When the RA relay operates after a single pulse has been received and counted by the stepping tube, the positive pulse generated by the network in the anode circuit is picked up by the additional cathode in the No. 1 position and applied to the control anodes of tubes 11A and 11B simultaneously through resistor R25 and condenser C11, and resistor R23 and condenser C10, respectively. Resistors R27, R28, R29, R30 and R31 are current-limiting resistors. Resistors R26 and R24 are pulse-forming resistors. Condensers C10, C11 and C12 are used for pulse-forming purposes.

After the first pulse the stepping tube normalizes as previously described. Only tube 11A ionizes because the pulse which is applied to the start anode of tube 11B through condenser C10 is short-circuited by varistor V6. This pulse is short-circuited because the side of varistor V6 which is connected to resistor R30 is highly negative since tube 11A was not conducting at this time and therefore the varistor offers a low impedance in its forward direction. When the second one-pulse digit is received relay RA operates again, causing a pulse from position 1 to be applied to tube 11B. Tube 11B now operates since the varistor, V6, now offers a high impedance to the pulse. This is due to the change in polarity across the varistor as a result of the operation of tube 11A which causes its cathode potential to increase from −48 volts to approximately 50 volts. Tube 11B ionized, operates relay 11X which locks under the control of off-normal relay ground and performs whatever functions may be desired for 11X operation. Each time relay RA operates under the above conditions, no registration is made as leads 0 and 1 are opened at the contacts of relay P2. Also because relay P2 is non-operated, the digit steering relays, AS . . . NS. did not advance.

*False count of one circuit*

In order that a wrong number will not be registered if the calling subscriber accidentally generates a single pulse by opening the switchhook contacts before dialing, the circuit is arranged so that a 1 cannot be registered in the A digit register. This is accomplished by preventing the operation of the P2 relay until at least two pulses have been counted for the A digit. As previously described, leads 0 and 1 are connected to the make contacts of relay P2 thereby preventing registration until the relay has operated. When the A digit contains two or more pulses, tube P2 and relay P2 operate over an obvious circuit. Relay P2 operating, locks to off-normal ground, connects leads 1 and 0 to the register and dismisses the 11X circuits by opening the pulsing lead.

From the foregoing description it can be appreciated that the present invention permits pulses to be detected, counted and registered at a more rapid rate than heretofore known.

It is to be understood that the hereinbefore described arrangements are but illustrative of the application of the principles of the invention. Numerous other arrangements may be devised by those skilled in the art without departing from the spirit and scope of the invention.

What is claimed is:

1. In a signaling system, an impulse responsive means, a pair of counting means, means controlled by said responsive means to advance both counting means in response to impulses received by said responsive means, a registering means, and means operative upon the cessation of impulses for selectively operating said registering means in accordance with the count contained in said counting means when both counting means have advanced to the same count and for operating said registering means in a different manner to indicate an alarm condition if both counting means have not advanced to the same count.

2. In a signaling system, an impulse responsive means, a pair of counting means, means controlled by said responsive means to advance both counting means in response to the impulses received by said responsive means, means operative upon the cessation of a first group of impulses for selectively operating a first group of registering means in accordance with the count contained in said pair of counting means when both counting means have advanced to the same count and for operating said registering means in a different manner to indicate an alarm condition if both counting means have not advanced to the same count, means operative to reset both of said counting means as a count is entered into said first group of registering means, and a plurality of additional groups of registering means into which counts are successively entered in response to the actuation of said impulse responsive means by succeeding groups of impulses.

3. In a signaling system, an impulse responsive means, a pair of counting means, means controlled by said responsive means to advance both counting means in response to impulses received by said responsive means, a registering means, and means operative upon the cessation of impulses for selectively operating said registering means in accordance with the count contained in said counting means when both counting means have advanced to the same count and for operating said registering means in a different manner to indicate an alarm condition if both counting means have not advanced to the same count, and means operative upon the termination of the reception of impulses for indicating that both of said counting means have advanced to a predetermined count.

4. In a signaling system, an impulse responsive means, a pair of counting means, means controlled by said responsive means to advance both counting means in response to the impulses received by said responsive means, means operative upon the cessation of a first group of impulses for selectively operating a first group of registering means in accordance with the count contained in said pair of counting means when both counting means have advanced to the same count and for operating said registering means in a different manner to indicate an alarm condition if both counting means have not advanced to the same count, means operative to reset both of said counting means as a count is entered into said first group of registering means, a plurality of additional groups of registering means into which counts are successively entered in response to the actuation of said impulse responsive means by succeeding groups of impulses, and means operative upon the termination of the reception of the first group of impulses for indicating that both of said counting means have advanced to a predetermined count.

5. In a signaling system, an impulse responsive means, a pair of counting means, means controlled by said responsive means to advance both counting means in response to the impulses received by said responsive means, means operative upon the cessation of a first group of impulses for selectively operating a first group of registering means in accordance with the count contained in said pair of counting means when both counting means have advanced to the same count and for operating said registering means in a different manner to indicate an alarm condition if both counting means have not advanced to the same count, means operative to reset both of said counting means as a count is entered into said first group of registering means, a plurality of additional groups of registering means into which counts are successively entered in response to the actuation of said impulse responsive means by succeeding groups of impulses, means operative upon the termination of the reception of the first group of impulses for indicating that both of said counting means have advanced to a predetermined count, and means operative to indicate an alarm condition if both of said counting means have not advanced beyond a predetermined count during the reception of the first two groups of impulses.

References Cited in the file of this patent

UNITED STATES PATENTS

| Number | Name | Date |
|---|---|---|
| 1,498,544 | Fowler | June 24, 1924 |
| 2,301,748 | Renshaw | Nov. 10, 1942 |
| 2,308,778 | Prince | Jan. v9, 1943 |
| 2,352,742 | Soffel | July 4, 1944 |
| 2,373,134 | Massonneau | Apr. 10, 1945 |
| 2,513,260 | Alfuen et al. | June 27, 1950 |
| 2,561,722 | Bascom | July 24, 1951 |
| 2,589,465 | Weiner | Mar. 18, 1952 |
| 2,597,428 | Bachelet | May 20, 1952 |

FOREIGN PATENTS

| Number | Country | Date |
|---|---|---|
| 134,125 | Sweden | Oct. 4, 1951 |